(12) United States Patent
Amano et al.

(10) Patent No.: US 8,178,995 B2
(45) Date of Patent: May 15, 2012

(54) POWER SUPPLY SYSTEM AND METHOD OF CONTROLLING POWER SUPPLY SYSTEM

(75) Inventors: Yasushi Amano, Aichi-gun (JP); Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 12/588,354

(22) Filed: Oct. 13, 2009

(65) Prior Publication Data

US 2010/0123452 A1 May 20, 2010

(30) Foreign Application Priority Data

Nov. 17, 2008 (JP) ................................. 2008-293005

(51) Int. Cl.
*B60L 1/00* (2006.01)
*B60L 3/00* (2006.01)
*H02G 3/00* (2006.01)
(52) U.S. Cl. .......... 307/9.1; 320/108; 336/115; 307/104
(58) Field of Classification Search .................. None
See application file for complete search history.

(56) References Cited

U.S. PATENT DOCUMENTS

| | | | | |
|---|---|---|---|---|
| 5,521,444 A | * | 5/1996 | Foreman | 307/104 |
| 5,654,621 A | * | 8/1997 | Seelig | 320/108 |
| 5,917,307 A | * | 6/1999 | Watanabe et al. | 320/108 |
| 6,803,744 B1 | * | 10/2004 | Sabo | 320/108 |
| 7,521,890 B2 | * | 4/2009 | Lee et al. | 320/108 |
| 2004/0164825 A1 | * | 8/2004 | Volant et al. | 335/78 |
| 2008/0296979 A1 | * | 12/2008 | Kato et al. | 307/104 |
| 2009/0015075 A1 | * | 1/2009 | Cook et al. | 307/149 |
| 2009/0079269 A1 | * | 3/2009 | Jin | 307/104 |

FOREIGN PATENT DOCUMENTS

| | | | |
|---|---|---|---|
| JP | 2004-260917 | * | 9/2004 |
| JP | 2006-217731 | * | 8/2006 |
| JP | A-2006-345588 | | 12/2006 |
| WO | WO 2007/008646 A2 | | 1/2007 |

\* cited by examiner

*Primary Examiner* — Rexford Barnie
*Assistant Examiner* — Justen Fauth
(74) *Attorney, Agent, or Firm* — Oliff & Berridge, PLC

(57) ABSTRACT

A power supply system that includes: a power supply coil and a power supply-side resonance coil that are provided at a facility; a power receiving coil and a power receiving-side resonance coil that are provided for a mobile unit; a power supply-side detection unit that detects a position of the power supply-side resonance coil; a power receiving-side detection unit that detects a position of the power receiving-side resonance coil; and an adjustment unit that adjusts a relative position of the power supply coil with respect to the power supply-side resonance coil and a relative position of the power receiving coil with respect to the power receiving-side resonance coil on the basis of the position of the power supply-side resonance coil and the position of the power receiving-side resonance coil.

15 Claims, 7 Drawing Sheets

DISTANCE BETWEEN POWER SUPPLY COIL
AND POWER SUPPLY-SIDE RESONANCE COIL
(DISTANCE BETWEEN POWER RECEIVING COIL
AND POWER RECEIVING-SIDE RESONANCE COIL)

RATIO

POWER SUPPLY SYSTEM AND METHOD OF CONTROLLING POWER SUPPLY SYSTEM

INCORPORATION BY REFERENCE

The disclosure of Japanese Patent Application No. 2008-293005 filed on Nov. 17, 2008, including the specification, drawings and abstract is incorporated herein by reference in its entirety.

BACKGROUND OF THE INVENTION

1. Field of the Invention

The invention relates to a power supply system and, more particularly, to a system that supplies electric power from a power supply coil, provided at a facility, to a power receiving coil, provided for a mobile unit such as a vehicle, in a non-contact manner and a method of controlling the system.

2. Description of the Related Art

There is known a non-contact power supply system that uses electromagnetic induction. For example, Japanese Patent Application Publication No. 2006-345588 (JP-A-2006-345588) describes a non-contact power supply device and a power supply system for an autonomous mobile unit. The non-contact power supply device described in JP-A-2006-345588 includes a primary coil that is electromagnetically coupled to a secondary coil of the autonomous mobile unit; communication means that acquires a power receiving state of the secondary coil side; power supply state acquisition means that acquires a power supply state of the primary coil side; power supply efficiency acquisition means that acquires a power supply efficiency from the power supply state of the primary coil side acquired by the power supply state acquisition means and the power receiving state of the secondary coil side acquired by the communication means; positioning means that moves a position of the primary coil so as to maximize the power supply efficiency acquired by the power supply efficiency acquisition means; retry instruction means that transmits a retry signal to the secondary coil side through the communication means when the power supply efficiency is lower than or equal to a predetermined value; and control means that controls the above means of the non-contact power supply device.

Supply of electric power in a non-contact manner is not limited to supplying electric power between the primary coil and the secondary coil as described above; instead, supply of electric power in a non-contact manner may also include supplying electric power using resonance coils. Supply of electric power in a non-contact manner using resonance coils is configured so that a power supply-side resonance coil and a power receiving-side resonance coil are provided between the primary coil (power supply coil) and the secondary coil (power receiving coil) and then electric power is supplied between the pair of resonance coils. In other words, the power supply coil and the power supply-side resonance coil are provided as a primary-side coil, and the power receiving coil and the power receiving-side resonance coil are provided as a secondary-side coil. The power supply coil, the resonance coils and the power receiving coil are electromagnetically coupled to one another, and electric power from the power supply coil is supplied to the power receiving coil through the resonance coils. In supplying electric power using the resonance coils as described above, a distance between the primary coil (power supply coil) and the power supply-side resonance coil and a distance between the secondary coil (power receiving coil) and the power receiving-side resonance coil are fixed. When a distance between the resonance coils changes, the power supply efficiency may also vary. In addition, when a battery mounted on a mobile unit such as a vehicle is charged as well, charging efficiency may possibly decrease.

SUMMARY OF THE INVENTION

The invention provides a power supply system that includes a power supply-side resonance coil and a power receiving-side resonance coil between a power supply coil and a power receiving coil to supply electric power in a non-contact manner and that is able to maintain or improve the power supply efficiency even when a distance between the power supply-side resonance coil and the power receiving-side resonance coil changes, and also provides a method of controlling the power supply system.

A first aspect of the invention relates to a power supply system. The power supply system includes: a power supply coil and a power supply-side resonance coil that are provided at a facility; a power receiving coil and a power receiving-side resonance coil that are provided for a mobile unit; a power supply-side detection unit that detects a position of the power supply-side resonance coil; a power receiving-side detection unit that detects a position of the power receiving-side resonance coil; and an adjustment unit that adjusts a relative position of the power supply coil with respect to the power supply-side resonance coil and a relative position of the power receiving coil with respect to the power receiving-side resonance coil on the basis of the position of the power supply-side resonance coil and the position of the power receiving-side resonance coil.

The adjustment unit may adjust a distance between the power supply coil and the power supply-side resonance coil and a distance between the power receiving coil and the power receiving-side resonance coil on the basis of a distance between the power supply-side resonance coil and the power receiving-side resonance coil.

The adjustment unit may adjust an amount of deviation in coil axis between the power supply coil and the power supply-side resonance coil and an amount of deviation in coil axis between the power receiving coil and the power receiving-side resonance coil on the basis of a distance between the power supply-side resonance coil and the power receiving-side resonance coil.

The adjustment unit may adjust an angle made between the power supply coil and the power supply-side resonance coil and an angle made between the power receiving coil and the power receiving-side resonance coil on the basis of a distance between the power supply-side resonance coil and the power receiving-side resonance coil.

The adjustment unit may adjust a coil radius of the power supply coil with respect to the power supply-side resonance coil and a coil radius of the power receiving coil with respect to the power receiving-side resonance coil on the basis of a distance between the power supply-side resonance coil and the power receiving-side resonance coil.

The adjustment, unit may adjust any one of a distance between the power supply coil and the power supply-side resonance coil, an amount of deviation in coil axis between the power supply coil and the power supply-side resonance coil, an angle made between the power supply coil and the power supply-side resonance coil or a coil radius of the power supply coil with respect to the power supply-side resonance coil and adjust any one of a distance between the power receiving coil and the power receiving-side resonance coil, an amount of deviation in coil axis between the power receiving coil and the power receiving-side resonance coil, an angle made between the power receiving coil and the power receiving-side resonance coil or a coil radius of the power receiving coil with respect to the power receiving-side resonance coil on the basis of a distance between the power supply-side resonance coil and the power receiving-side resonance coil.

A second aspect of the invention relates to a power supply system. The power supply system includes: a power supply coil and a power supply-side resonance coil that are provided at a facility; a power receiving coil and a power receiving-side resonance coil that are provided for a mobile unit; a power supply efficiency detection unit that detects a power supply efficiency that indicates a transmission efficiency of electric power; and an adjustment unit that, after the mobile unit stops around the facility, changes a relative position between the power supply coil and the power supply-side resonance coil and a relative position between the power receiving coil and the power receiving-side resonance coil within a predetermined range, and that adjusts the relative positions within the predetermined range so as to substantially maximize the power supply efficiency detected by the power supply efficiency detection unit.

A third aspect of the invention relates to a method of controlling a power supply system that includes a power supply coil and a power supply-side resonance coil that are provided at a facility; and a power receiving coil and a power receiving-side resonance coil that are provided for a mobile unit. The method includes: detecting a position of the power supply-side resonance coil; detecting a position of the power receiving-side resonance coil; and adjusting a relative position of the power supply coil with respect to the power supply-side resonance coil and a relative position of the power receiving coil with respect to the power receiving-side resonance coil on the basis of the position of the power supply-side resonance coil and the position of the power receiving-side resonance coil.

A fourth aspect of the invention relates to a method of controlling a power supply system that includes a power supply coil and a power supply-side resonance coil that are provided at a facility; and a power receiving coil and a power receiving-side resonance coil that are provided for a mobile unit. The method includes: detecting a power supply efficiency that indicates a transmission efficiency of electric power; and, after the mobile unit stops around the facility, adjusting a relative position between the power supply coil and the power supply-side resonance coil and a relative position between the power receiving coil and the power receiving-side resonance coil within a predetermined range so as to substantially maximize the power supply efficiency.

With the power supply system and the method of controlling a power supply system according to the aspects of the invention, it is possible to maintain or improve the power supply efficiency even when a distance between the power supply-side resonance coil and the power receiving-side resonance coil changes.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
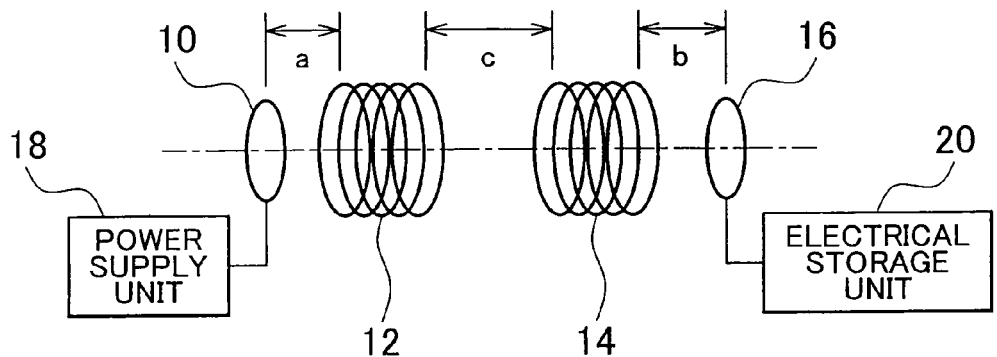
FIG. 1 is a configuration diagram of an embodiment of the invention.

FIG. 1 shows a configuration block diagram of a power supply system according to an embodiment of the invention. The power supply system includes a power supply coil 10, a power supply-side resonance coil 12, a power receiving-side resonance coil 14 and a power receiving coil 16. The power supply coil 10 and the power supply-side resonance coil 12 serve as a primary-side coil and are provided at a facility, such as a power supply station. The power receiving-side resonance coil 14 and the power receiving coil 16 serve as a secondary-side coil and are provided for a mobile unit, such as a vehicle. The power supply coil 10 is supplied with electric power from a power supply unit 18. Then, the supplied electric power is supplied from the power supply coil 10 to the power supply-side resonance coil 12, from the power supply-side resonance coil 12 to the power receiving-side resonance coil 14 and further from the power receiving-side resonance coil 14 to the power receiving coil 16 in a non-contact manner. The electric power obtained by the power receiving coil 16 is supplied to an electrical storage unit 20. The electrical storage unit 20 is a nickel metal hydride battery, a lithium ion battery or another secondary battery, which is mounted on the mobile unit, such as a vehicle. It is also applicable that a charge control unit is provided between the power receiving coil 16 and a vehicle-mounted secondary battery and then the charge control unit controls charging of the vehicle-mounted secondary battery. For example, the charge control unit monitors a state of charge (SOC) of the vehicle-mounted secondary battery, and issues a charge stop instruction to stop charging the vehicle-mounted secondary battery when the charging control unit detects that the SOC of the vehicle-mounted secondary battery is full owing to charging. The charge stop instruction is transmitted to the power supply station side through wireless communication, or the like, and then supply of power to the power supply coil 10 is stopped. The charge control unit may interrupt connection between the power receiving coil 16 and the vehicle-mounted secondary battery by switch means, or the like, when the SOC of the vehicle-mounted secondary battery is full.

Here, a distance between the power supply coil 10 and the power supply-side resonance coil 12 is denoted by a, a distance between the power receiving coil 16 and the power receiving-side resonance coil 14 is denoted by b, and a distance between the power supply-side resonance coil 12 and the power receiving-side resonance coil 14 is denoted by c. The power supply-side resonance coil 12 is provided at the facility, such as a power supply station, and the power receiving-side resonance coil 14 is provided for the mobile unit, such as a vehicle. Thus, when the vehicle is not stopped, the distance c between the power supply-side resonance coil 12 and the power receiving-side resonance coil 14 may vary. In the present embodiment, assuming that the distance c between the power supply-side resonance coil 12 and the power receiving-side resonance coil 14 changes, the distance a between the power supply coil 10 and the power supply-side resonance coil 12 and the distance b between the power receiving coil 16 and the power receiving-side resonance coil 14 both are made variable, and the distance a and the distance b are changed with a change in the distance c to maintain or improve the power supply efficiency. Note that in the present embodiment, a state where the vehicle is stopped includes not only a state where the vehicle is actually stopped but also a state where a relative velocity between the vehicle and the power supply station, or the like, is close to zero.

Figure 2:
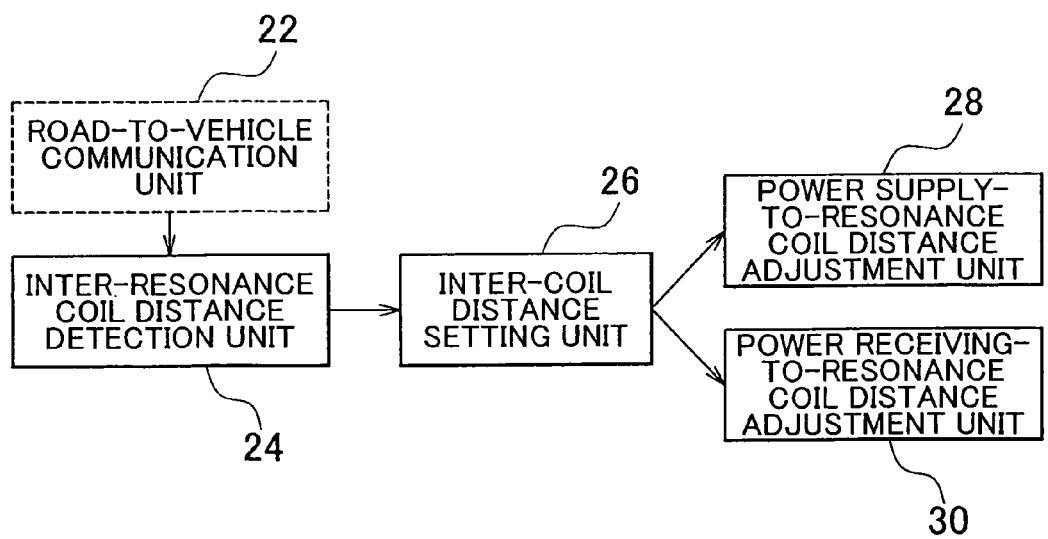
FIG. 2 is a functional block diagram of the embodiment.

FIG. 2 shows a functional block diagram of the present embodiment. The power supply system includes a road-to-vehicle communication unit 22, an inter-resonance coil distance detection unit 24, an inter-coil distance setting unit 26, a power supply-to-resonance coil distance adjustment unit 28 and a power receiving-to-resonance coil distance adjustment unit 30.

The road-to-vehicle communication unit 22 carries out data communication with a road beacon, or the like, to acquire position data of the power supply-side resonance coil 12 provided at the power supply station. In addition, the road-to-vehicle communication unit 22 is linked with a car navigation system to detect a position of the mobile unit, such as a vehicle. A current position of the vehicle may be obtained by receiving GPS radio waves from a GPS satellite. It is also applicable that a position of the mobile unit may be detected by a combination of position detection through the GPS and position detection obtained from a vehicle speed and a steering angle (or a bearing). In addition, a position of the mobile unit may also be detected by a DGPS (differential GPS). The power receiving-side resonance coil 14 is provided at a predetermined location of the mobile unit, such as a vehicle. Thus, by detecting a current position of the vehicle, a position of the power receiving-side resonance coil 14 may also be acquired at the same time. A position of the power receiving-side resonance coil 14 may be detected by adding a predetermined offset to a current position of the vehicle. The predetermined offset is determined on the basis of the installation location of the power receiving-side resonance coil 14. The road-to-vehicle communication unit 22 supplies the inter-resonance coil distance detection unit 24 with the detected position data of the power supply-side resonance coil 12 and the detected position data of the power receiving-side resonance coil 14.

The inter-resonance coil distance detection unit 24 calculates the distance c between the power supply-side resonance coil 12 and the power receiving-side resonance coil 14 on the basis of the supplied pieces of position data. Note that in FIG. 1, in a state where the coil axis of the power supply-side resonance coil 12 and the coil axis of the power supply-side resonance coil 14 are arranged in the same straight line, a distance between the two resonance coils is defined as the distance b. The inter-resonance coil distance detection unit 24 obtains the distance c when it is presumable, on the basis of the respective pieces of position data of the two resonance coils, that the coil axes of the two resonance coils are arranged in substantially the same straight line. When the coil axes of the two resonance coils are arranged in the same straight line, for example, includes when the vehicle stops immediately above the power supply-side resonance coil 12 at the power supply station and the power receiving-side resonance coil 14 is located to face the power supply-side resonance coil 12. The inter-resonance coil distance detection unit 24 supplies the detected distance c to the inter-coil distance setting unit 26.

The inter-coil distance setting unit 26 sets the distance a between the power supply coil 10 and the power supply-side resonance coil 12 and the distance b between the power receiving coil 16 and the power receiving-side resonance coil 14 on the basis of the detected distance c. That is, the inter-coil distance setting unit 26 sets the distances a and b, at which the power supply efficiency is maximum, on the basis of the distance c. The inter-coil distance setting unit 26 supplies the set distances a and b respectively to the power supply-to-resonance coil distance adjustment unit 28 and the power receiving-to-resonance coil distance adjustment unit 30.

The power supply-to-resonance coil distance adjustment unit 28 adjusts the distance a between the power supply coil 10 and the power supply-side resonance coil 12 so that the distance a coincides with the distance set by the inter-coil distance setting unit 26. The power receiving-to-resonance coil distance adjustment unit 30 adjusts the distance b between the power receiving coil 16 and the power receiving-side resonance coil 14 so that the distance b coincides with the distance set by the inter-coil distance setting unit 26.

The inter-resonance coil distance detection unit 24 and the inter-coil distance setting unit 26 each may be implemented by a CPU. In addition, a selected drive mechanism that relatively moves the power supply coil 10 with respect to the resonance coil 12 may be used as the power supply-to-resonance coil distance adjustment unit 28, and a selected drive mechanism that relatively moves the power receiving coil 16 with respect to the resonance coil 14 may be used as the power receiving-to-resonance coil distance adjustment unit 30.

Figure 3:
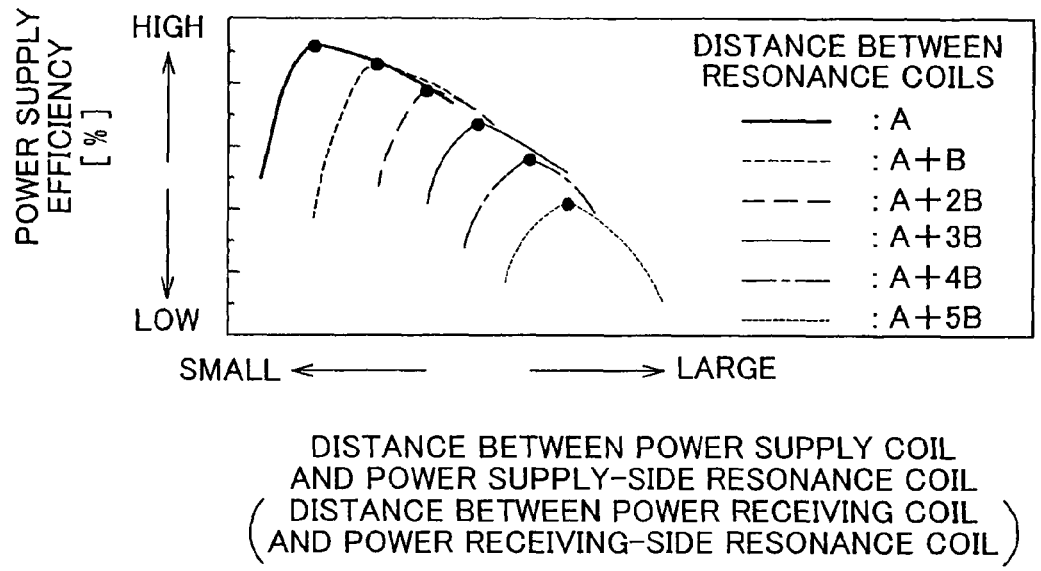
FIG. 3 is a graph that shows the relationship between a power supply efficiency and a distance between a power supply coil and a power supply-side resonance coil (or a distance between a power receiving coil and a power receiving-side resonance coil)

FIG. 3 shows the relationship between a power supply efficiency and a distance between the power supply coil 10 and the power supply-side resonance coil 12. In the drawing, the distance c between the resonance coils is changed among A cm, A+B cm, A+2B cm, A+3B cm, A+4B cm and A+5B cm. It is apparent that the distances a and b that give the maximum efficiency vary on the basis of the distance c between the resonance coils. Qualitatively, as the distance c increases, the distances a and b that give the maximum efficiency both increase. However, as the distance c increases, the efficiency itself decreases. This also applies to the relationship between a power supply efficiency and a distance b between the power receiving coil 16 and the power receiving-side resonance coil 14.

The inter-coil distance setting unit 26 sets the distance a on the basis of the relationship shown in FIG. 3 so as to maximize the power supply efficiency. Similarly, the inter-coil distance setting unit 26 sets the distance c so as to maximize the power supply efficiency.

Figure 4:
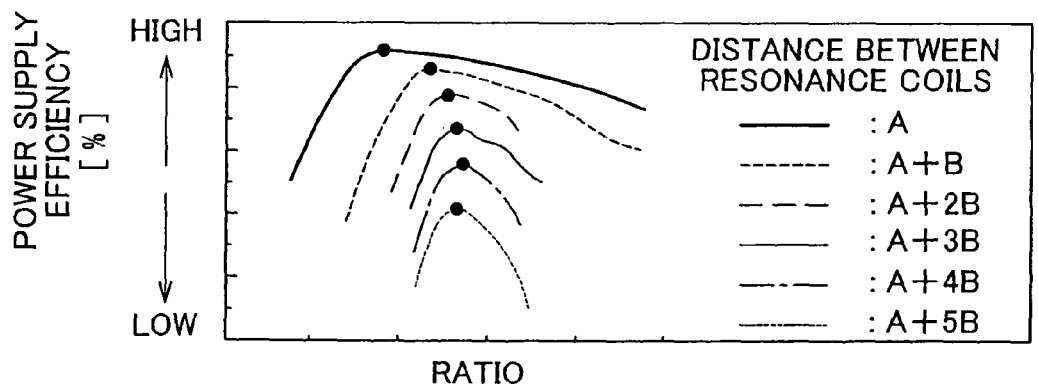
FIG. 4 is a graph that shows the relationship between a power supply efficiency and a ratio of a distance between the power supply coil and the power supply-side resonance coil (or a distance between the power receiving coil and the power receiving-side resonance coil) to a distance between the resonance coils.

FIG. 4 shows the relationship between a power supply efficiency and a distance ratio=(distance a between the power supply coil 10 and the power supply-side resonance coil 12)/(distance c between the resonance coils). The distance c between the resonance coils is changed among A cm, A+B cm, A+2B cm, A+3B cm, A+4B cm and A+5B cm as in the case of FIG. 3. It is apparent that, at any of the distances c between the resonance coils, supply of power may be carried out at the maximum efficiency by setting the distance ratio to fall within a predetermined range. This also applies to the relationship between a power supply efficiency and a distance ratio=(distance b between the power receiving coil 16 and the power receiving-side resonance coil 14)/(distance c between the resonance coils). The inter-coil distance setting unit 26 sets the distances a and b so that ratios of a detected distance c to the distances a and b fall within predetermined ranges on the basis of the relationships shown in FIG. 3 and FIG. 4.

Figure 5:
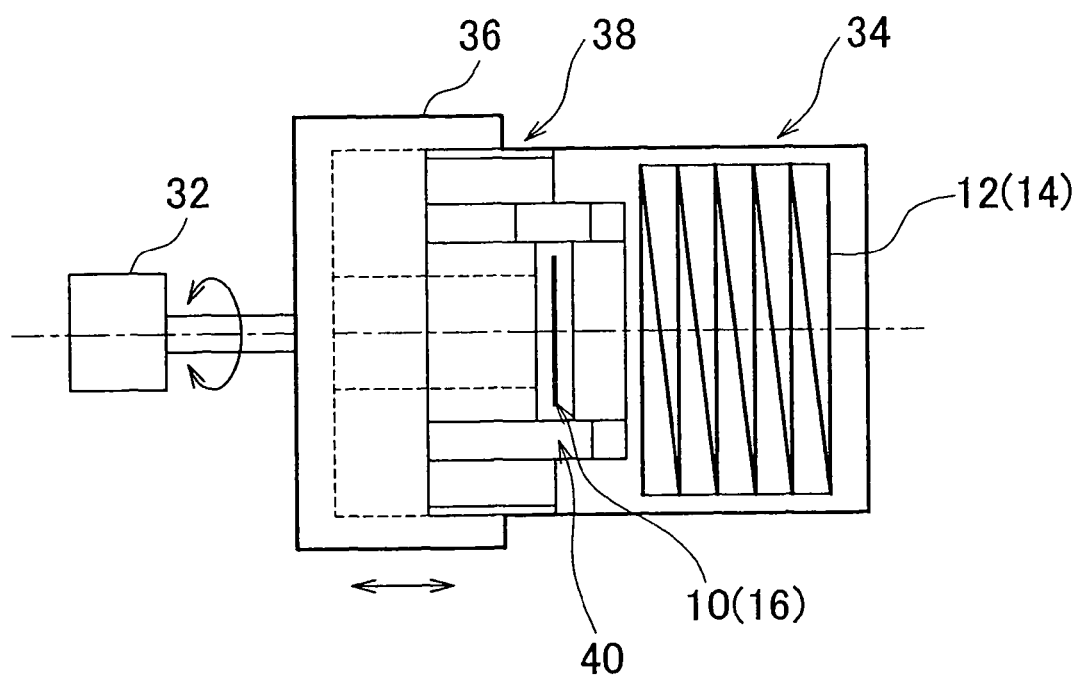
FIG. 5 is a configuration diagram of an adjustment unit that adjusts a distance between the power supply coil and the power supply-side resonance coil (or a distance between the power receiving coil and the power receiving-side resonance coil)

FIG. 5 shows one example of the configuration of the power supply-to-resonance coil distance adjustment unit 28. The power supply coil 10 and the power supply-side resonance coil 12 are opposed in a cylindrical accommodating case 34 so that the directions of the coil axes of them are arranged in the same straight line. The power supply coil 10 is supported by a support base 40 that slides in the accommodating case 34. An internal thread is formed on the inner surface of the support base 40. An external thread 38 is formed on the outer surface of the accommodating case 34. The support base 40 is attached to a movable base 36 that is screwed to the external thread 38. The movable base 36 is driven for rotation by a stepping motor 32. As the stepping motor 32 rotates in one direction, the movable base 36 screwed to the external thread formed on the outer surface of the accommodating case 34 moves along the accommodating case 34, and the power supply coil 10 also moves to approach the power supply-side resonance coil 12. As the stepping motor 32 rotates in reverse direction, the power supply coil 10 moves away from the power supply-side resonance coil 12. The stepping motor 32 rotates by an angle corresponding to a difference between a current distance and a distance set by the inter-coil distance setting unit 26. This also applies to the power receiving-to-resonance coil distance adjustment unit 30.

In this way, in the present embodiment, the distance c between the resonance coils is detected, and the distance a and the distance b are adjusted on the basis of the distance c. Thus, it is possible to carry out supply of power at the maximum efficiency based on the distance c. Hence, it is possible to efficiently charge the vehicle-mounted secondary battery.

In the present embodiment, the distance a and the distance b are variably adjusted on the basis of the distance c to maintain or improve the power supply efficiency. Instead, the amount of deviation and/or angle of each of the power supply coil 10 and the power receiving coil 16 may also be adjusted with respect to the resonance coils.

Figure 6:
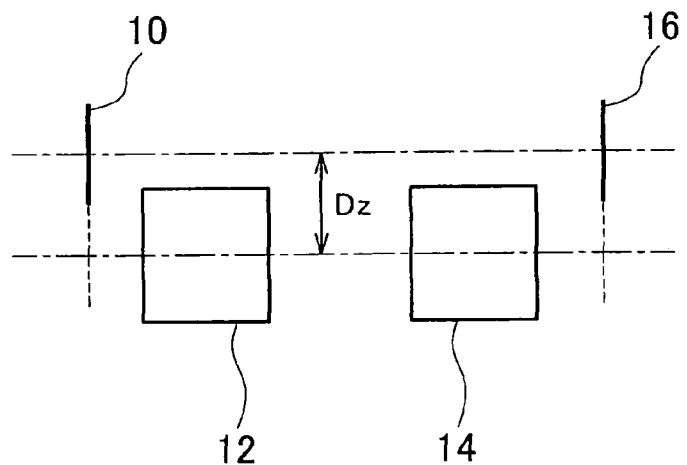
FIG. 6 is a view that illustrates an amount of deviation between the power supply coil and the power receiving coil.

FIG. 6 shows the positional relationship among the power supply coil 10, the power receiving coil 16 and the resonance coils 12 and 14. The directions of the axes of the power supply-side resonance coil 12 and the power receiving-side resonance coil 14 are arranged in the same straight line; however, the direction of the axis of the power supply coil 10 is deviated by Dz with respect to the power supply-side resonance coil 12. The direction of the axis of the power receiving coil 16 is also deviated by Dz with respect to the power receiving-side resonance coil 14.

Figure 7:
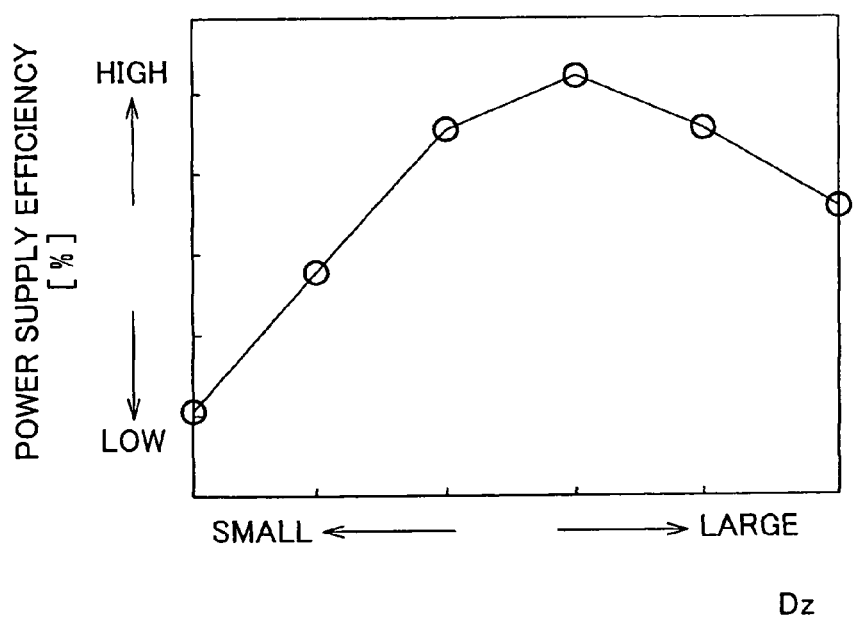
FIG. 7 is a graph that shows the relationship between an amount of deviation and a power supply efficiency.

FIG. 7 shows changes in power supply efficiency when the amount of deviation Dz between the coil axes is changed. The distance c between the resonance coils is fixed. Until Dz reaches a predetermined value, the power supply efficiency increases as Dz increases, and the power supply efficiency is maximum when Dz is the predetermined value. As Dz further increases beyond the predetermined value, the power supply efficiency decreases on the contrary. Thus, the power supply-to-resonance coil distance adjustment unit 28 and the power receiving-to-resonance coil distance adjustment unit 30 are able to improve the power supply efficiency by adjusting the amount of deviation Dz instead of adjusting the distances a and b on the basis of the distance c or in addition to adjusting the distances a and b on the basis of the distance c.

Figure 8:
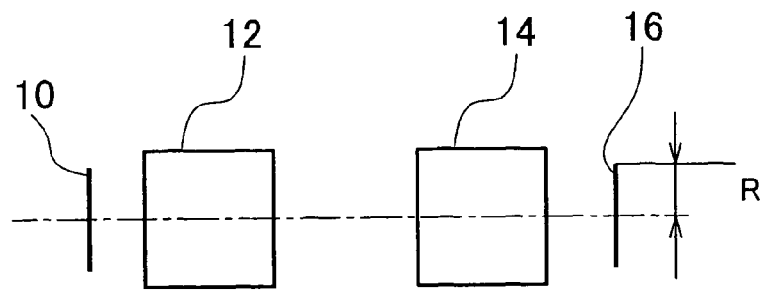
FIG. 8 is a view that illustrates a coil radius of the power supply coil and a coil radius of the power receiving coil.

FIG. 8 shows another positional relationship among the power supply coil 10, the power receiving coil 16 and the resonance coils 12 and 14. The coil axes of the power supply coil 10, power receiving coil 16 and resonance coils 12 and 14 are arranged in the same straight line (as in the case of FIG. 1). However, in this example, coil radii R of the power supply coil 10 and power receiving coil 16 are variously changed.

Figure 9:
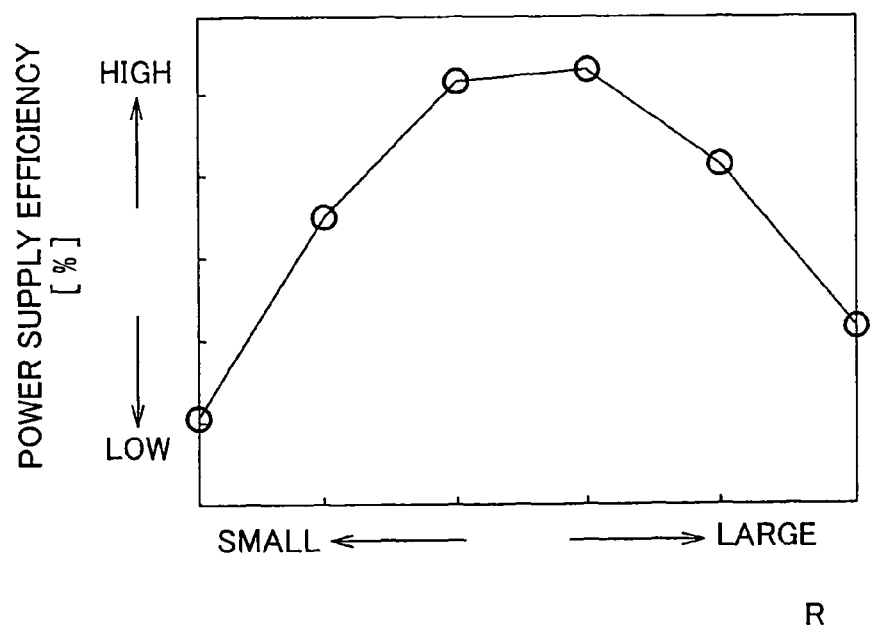
FIG. 9 is a graph that shows the relationship between a coil radius and a power supply efficiency.

FIG. 9 shows changes in power supply efficiency when the coil radii (coil radii in FIG. 9) R are changed. The power supply efficiency is maximum when R falls within a predetermined range, and the power supply efficiency decreases when R falls outside the predetermined range. Thus, the power supply-to-resonance coil distance adjustment unit 28 and the power receiving-to-resonance coil distance adjustment unit 30 are able to improve the power supply efficiency by adjusting the coil radii R instead of adjusting the distances a and b on the basis of the distance c or in addition to adjusting the distances a and b on the basis of the distance c.

Figure 10:
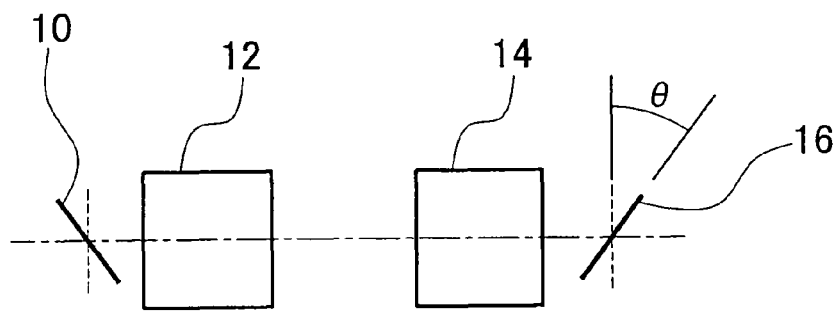
FIG. 10 is a view that illustrates an angle of the power supply coil and an angle of the power receiving coil.

FIG. 10 shows another positional relationship among the power supply coil 10, the power receiving coil 16 and the resonance coils 12 and 14. The coil axes of the power supply coil 10 and power receiving coil 16 are respectively inclined by an angle $\theta$ with respect to the coil axes of the resonance coils 12 and 14. Note that the direction in which the power supply coil 10 is inclined is opposite to the direction in which the power receiving coil 16 is inclined.

Figure 11:
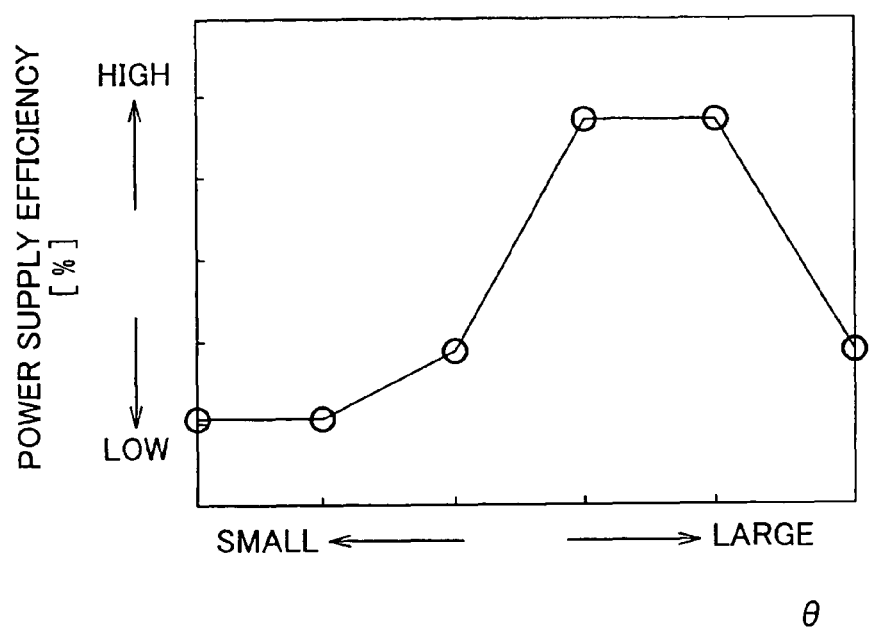
FIG. 11 is a graph that shows the relationship between an angle and a power supply efficiency.

FIG. 11 shows changes in power supply efficiency when the angle $\theta$ is changed. The power supply efficiency is maximum when $\theta$ falls within a predetermined range, and the power supply efficiency decreases when $\theta$ falls outside the predetermined range. Thus, the power supply-to-resonance coil distance adjustment unit 28 and the power receiving-to-resonance coil distance adjustment unit 30 are able to improve the power supply efficiency by adjusting the angle $\theta$ instead of adjusting the distances a and b on the basis of the distance c or in addition to adjusting the distances a and b on the basis of the distance c.

Figure 12:
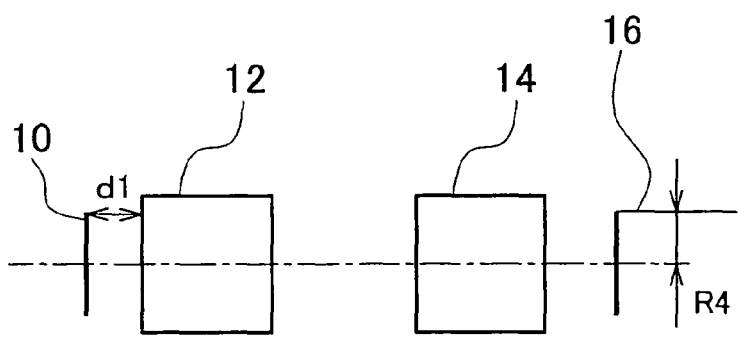
FIG. 12 is a view that illustrates a distance of the power supply coil and a coil radius of the power receiving coil.

FIG. 12 shows another positional relationship among the power supply coil 10, the power receiving coil 16 and the resonance coils 12 and 14. The coil axes of the power supply coil 10, power receiving coil 16 and resonance coils 12 and 14 are arranged in the same straight line (as in the case of FIG. 1). However, in this example, a distance d1 between the power supply coil 10 and the power supply-side resonance coil 12 is changed, a coil radius (coil radius in FIG. 12) R4 of the power receiving coil 16 is variously changed.

Figure 13:
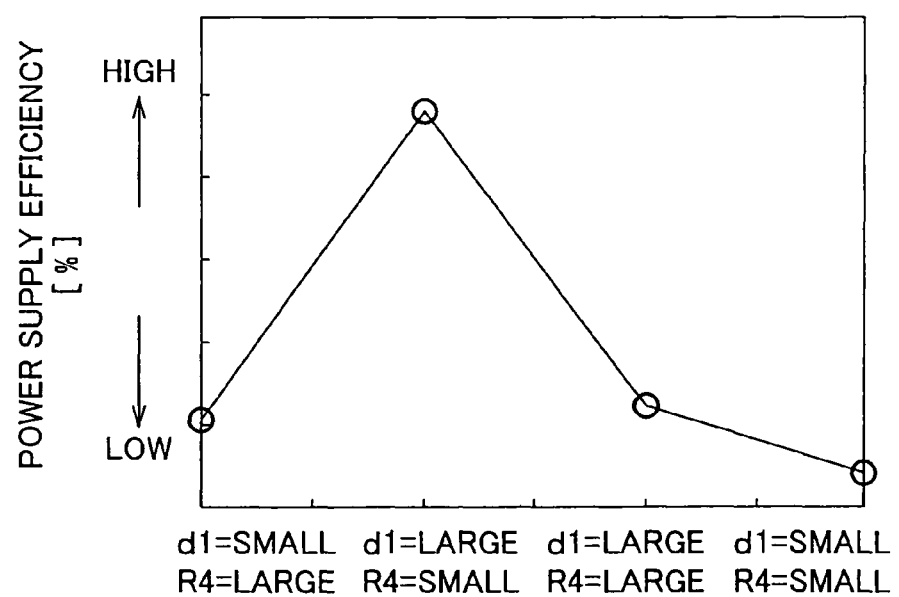
FIG. 13 is a graph that shows the relationship between a power supply efficiency and a combination of a distance and a coil radius.

FIG. 13 shows changes in power supply efficiency when the distance d1 and the coil radius R4 are changed. FIG. 13 shows the cases where a combination (d1, R4) is (small, large), (large, small), (large, large) and (small, small). When the case where a combination (d1, R4) is (small, large) is used as a reference, the power supply efficiency increases in the case (large, small) where the distance d1 and the coil radius R4 both are changed. In addition, the effect of increase in power supply efficiency is small in the cases (large, large) and (small, small) where any one of the distance d1 and the coil radius R4 is changed. Thus, the power supply-to-resonance coil distance adjustment unit 28 and the power receiving-to-resonance coil distance adjustment unit 30 are able to improve the efficiency by changing the distance d1 of the power supply coil 10 on the basis of the distance c and changing the coil radius R4 of the power receiving coil 16. It is also applicable that the coil radius of the power supply coil 10 is changed and the distance of the power receiving coil 16 is changed. In addition, it is also applicable that the distance d1 of the power supply coil 10 is changed and the amount of deviation Dz of the power receiving coil 16 is changed. In short, it is applicable that any one of the distance, amount of deviation, angle and coil radius of the power supply coil 10 is changed and, at the same time, any one of the distance, amount of deviation, angle and coil radius of the power receiving coil 16 is changed.

As described above, in the present embodiment, it is possible to carry out supply of power at the maximum efficiency based on the distance c by adjusting at least any one of the distance a of the power supply coil 10 and the distance b of the power receiving coil 16, the amount of deviation Dz of the power supply coil 10 and the amount of deviation Dz of the power receiving coil 16, the angle θ of the power supply coil 10 and the angle θ of the power receiving coil 16 or the coil radius R of the power supply coil 10 and the coil radius R of the power receiving coil 16 or selectively in combination on the basis of the distance c between the resonance coils. It is also applicable that the relative positions of the power supply coil 10 and power receiving coil 12 with respect to the resonance coils 12 and 14 are adjusted on the basis of the distance c between the resonance coils.

For example, the power supply efficiency is maximized by adjusting the distance a of the power supply coil 10 and the distance b of the power receiving coil 16 on the basis of the distance c. Then, the obtained power supply efficiency is compared with a predetermined threshold. When the obtained power supply efficiency is higher than or equal to the predetermined threshold, it is determined that the power supply efficiency is sufficient, and supply of power is carried out in that state. On the other hand, when the obtained power supply efficiency has not reached the predetermined threshold, it is determined that the power supply efficiency is insufficient, and then the amount of deviation Dz of each of the power supply coil 10 and the power receiving coil 16 is adjusted to maximize the power supply efficiency. Then, the obtained power supply efficiency is compared with the threshold again. When the obtained power supply efficiency is higher than or equal to the predetermined threshold, supply of power is carried out in that state. On the other hand, when the obtained power supply efficiency has not reached the predetermined threshold, it is determined that the power supply efficiency is still insufficient, and then the angle θ of each of the power supply coil 10 and the power receiving coil 16 is adjusted. Then, the obtained power supply efficiency is compared with the threshold again. When the obtained power supply efficiency has not reached the predetermined threshold, the result is notified to an occupant of the mobile unit, such as a vehicle, and the occupant is instructed to adjust a stop position to carry out supply of power again. Alternatively, drive control means of the vehicle may minutely adjust the position of the vehicle automatically. After the angle θ is adjusted, the amount of deviation Dz may be adjusted. When comparing FIG. 7 and FIG. 11, the power supply efficiency obtained by adjusting the amount of deviation Dz is higher than the power supply efficiency obtained by adjusting the angle θ. Thus, it is generally desirable that the amount of deviation Dz is preferentially adjusted. Of course, (1) adjustment of the distances a and b, (2) adjustment of the amounts of deviation Dz, (3) adjustment of the coil radii R and (4) adjustment of the angles θ are independent of one another, and it is applicable that these adjustments are carried out in a selected sequence to maximize the power supply efficiency. The following shows an example of a sequence of adjustment.

(1)→(2)→(4)
(1)→(4)→(2)
(1)→(3)
(2)→(1)→(3)
(4)→(1)→(3)
(3)→(1)

Note that in the present embodiment, even when the positions of the respective coils are not identified, because there is a relationship having a peak characteristic between a transmission efficiency and each of the distances of the respective coils, it is also applicable that the distances of the respective coils are adjusted so as to maximize the transmission efficiency while detecting the transmission efficiency. First, one of the distance between the power supply coil 10 and the resonance coil 12 or the distance between the power receiving coil 16 and the resonance coil 14 is changed within a predetermined range to adjust the positions of the coils so as to substantially maximize the power supply efficiency, and then the other one of the distances is changed within a predetermined range to adjust the positions of the coils so as to substantially maximize the power supply efficiency.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A power supply system comprising:
   a power supply coil that is supplied with power from a power supply unit;
   a power supply-side resonance coil that is supplied with power from the power supply coil in a non-contact manner;
   a power receiving-side resonance coil that is supplied with power from the power supply-side resonance coil in a non-contact manner;
   a power receiving coil that is supplied with power from the power receiving-side resonance coil in a non-contact manner; and
   an adjustment unit that adjusts at least one of a distance between the power supply coil and the power supply-side resonance coil and a distance between the power receiving coil and the power receiving-side resonance coil on the basis of a distance between the power supply-side resonance coil and the power receiving-side resonance coil.

2. The power supply system according to claim 1, wherein the adjustment unit adjusts the at least one of the distance between the power supply coil and the power supply-side resonance coil and the distance between the power receiving coil and the power receiving-side resonance coil so as to increase a power supply efficiency.

3. The power supply system according to claim 1, wherein the adjustment unit adjusts at least one of the distance between the power supply coil and the power supply-side resonance coil and the distance between the power receiving coil and the power receiving-side resonance coil so that at least one of a power supply-side distance ratio and a power receiving-side distance ratio falls within a predetermined range, the power supply-side distance ratio is a ratio of a distance between the power supply coil and the power supply-side resonance coil to a distance between the power supply-side resonance coil and the power receiving-side resonance coil, and the power receiving-side distance ratio is a ratio of a distance between the power receiving coil and the power receiving-side resonance coil to a distance between the power supply-side resonance coil and the power receiving-side resonance coil.

4. The power supply system according to claim 3, wherein the adjustment unit adjusts the power supply-side distance ratio or the power receiving-side distance ratio so as to increase a power supply efficiency.

5. The power supply system according to claim 1, wherein the adjustment unit adjusts at least one of an amount of deviation in coil axis between the power supply coil and the power supply-side resonance coil and an amount of deviation in coil axis between the power receiving coil and the power receiving-side resonance coil on the basis of the distance between the power supply-side resonance coil and the power receiving-side resonance coil.

6. The power supply system according to claim 1, wherein the adjustment unit adjusts at least one of an angle made between the power supply coil and the power supply-side resonance coil and an angle made between the power receiving coil and the power receiving-side resonance coil on the basis of the distance between the power supply-side resonance coil and the power receiving-side resonance coil.

7. The power supply system according to claim 1, wherein the adjustment unit adjusts at least one of a coil radius of the power supply coil with respect to the power supply-side resonance coil and a coil radius of the power receiving coil with respect to the power receiving-side resonance coil on the basis of the distance between the power supply-side resonance coil and the power receiving-side resonance coil.

8. The power supply system according to claim 1, wherein the adjustment unit adjusts any one of a distance between the power supply coil and the power supply-side resonance coil, an amount of deviation in coil axis between the power supply coil and the power supply-side resonance coil, an angle made between the power supply coil and the power supply-side resonance coil, a coil radius of the power supply coil with respect to the power supply-side resonance coil, a distance between the power receiving coil and the power receiving-side resonance coil, an amount of deviation in coil axis between the power receiving coil and the power receiving-side resonance coil, an angle made between the power receiving coil and the power receiving-side resonance coil or a coil radius of the power receiving coil with respect to the power receiving-side resonance coil on the basis of the distance between the power supply-side resonance coil and the power receiving-side resonance coil.

9. A power supply system comprising:
a power supply coil that is supplied with power from a power supply unit;
a power supply-side resonance coil that is supplied with power from the power supply coil in a non-contact manner;
a power receiving-side resonance coil that is supplied with power from the power supply-side resonance coil in a non-contact manner;
a power receiving coil that is supplied with power from the power receiving-side resonance coil in a non-contact manner; and
an adjustment unit that makes shorter at least one of a distance between the power supply coil and the power supply-side resonance coil and a distance between the power receiving coil and the power receiving-side resonance coil when a distance between the power supply-side resonance coil and the power receiving-side resonance coil is short, as compared to when the distance between the power supply side-side resonance coil and the power receiving-side resonance coil is long.

10. A power receiving device comprising:
a power receiving-side resonance coil that is supplied with power from a power supply-side resonance coil at a power supply device in a non-contact manner;
a power receiving coil that is supplied with power from the power receiving-side resonance coil in a non-contact manner; and
an adjustment unit that adjusts a distance between the power receiving coil and the power receiving-side resonance coil on the basis of a distance between the power supply-side resonance coil and the power receiving-side resonance coil.

11. A power receiving device comprising:
a power receiving-side resonance coil that is supplied with power from a power supply-side resonance coil at a power supply device in a non-contact manner;
a power receiving coil that is supplied with power from the power receiving-side resonance coil in a non-contact manner; and
an adjustment unit that makes shorter a distance between the power receiving coil and the power receiving-side resonance coil when a distance between the power supply-side resonance coil and the power receiving-side resonance coil is short, as compared to when the distance between the power supply side-side resonance coil and the power receiving-side resonance coil is long.

12. A power supply device comprising:
a power supply coil that is supplied with power from a power supply unit;
a power supply-side resonance coil that is supplied with power from the power supply coil in a non-contact manner and supplies power to a power receiving-side resonance coil at a receiving device in a non-contact manner; and
an adjustment unit that adjusts a distance between the power supply coil and the power supply-side resonance coil on the basis of a distance between the power supply-side resonance coil and the power receiving-side resonance coil.

13. A power supply device comprising:
a power supply coil that is supplied with power from a power supply unit;
a power supply-side resonance coil that is supplied with power from the power supply coil in a non-contact manner and supplies power to a power receiving-side resonance coil at a receiving device in a non-contact manner; and
an adjustment unit that makes shorter a distance between the power supply coil and the power supply-side resonance coil when a distance between the power supply-side resonance coil and the power receiving-side resobetween the power supply-side resonance coil and the power receiving-side resonance coil is long.

14. A method of controlling a power supply system comprising:
supplying power to a power supply coil from a power unit;
supplying power to a power supply-side resonance coil from the power supply coil in a non-contact manner;
supplying power to a power receiving-side resonance coil from the power supply-side resonance coil in a non-contact manner;
supplying power to a power receiving coil from the power receiving-side resonance coil in a non-contact manner; and
adjusting at least one of a distance between the power supply coil and the power supply-side resonance coil and a distance between the power receiving coil and the power receiving-side resonance coil on the basis of a distance between the power supply-side resonance coil and the power receiving-side resonance coil.

15. The method of controlling the power system according to claim 14, wherein the adjusting includes making shorter the at least one of the distance between the power supply coil and the power supply-side resonance coil and the distance between the power receiving coil and the power receiving-side resonance coil when the distance between the power supply-side resonance coil and the power receiving-side resonance coil is short, as compared to when the distance between the power supply side-side resonance coil and the power receiving-side resonance coil is long.

* * * * *